US009487711B2

(12) United States Patent
Davis et al.

(10) Patent No.: US 9,487,711 B2
(45) Date of Patent: Nov. 8, 2016

(54) PROCESS FOR THE CONVERSION OF FATTY ACIDS AND DERIVATIVES THEREOF

(75) Inventors: David Davis, County Durham (GB); Cornelis Martinus Lok, The Hague (NL); Michael John Watson, Eaglescliffe (GB); Aalbert Zwijnenburg, Doetinchem (NL)

(73) Assignee: Johnson Matthey PLC, London (GB)

( * ) Notice: Subject to any disclaimer, the term of this patent is extended or adjusted under 35 U.S.C. 154(b) by 823 days.

(21) Appl. No.: 12/865,797

(22) PCT Filed: Jan. 26, 2009

(86) PCT No.: PCT/GB2009/050073
§ 371 (c)(1),
(2), (4) Date: Nov. 24, 2010

(87) PCT Pub. No.: WO2009/095711
PCT Pub. Date: Aug. 6, 2009

(65) Prior Publication Data
US 2011/0105817 A1 May 5, 2011

(30) Foreign Application Priority Data

Feb. 1, 2008 (GB) .................................. 0801878.0
Jun. 12, 2008 (GB) .................................. 0810779.9

(51) Int. Cl.
*C07C 1/20* (2006.01)
*C10G 3/00* (2006.01)
*B01J 29/064* (2006.01)
*B01J 29/076* (2006.01)
*C10G 45/60* (2006.01)
*C07C 1/207* (2006.01)
*B01J 23/40* (2006.01)
*B01J 23/70* (2006.01)
*B01J 29/22* (2006.01)
*B01J 29/67* (2006.01)
*B01J 29/68* (2006.01)
*B01J 29/74* (2006.01)

(52) U.S. Cl.
CPC .............. *C10G 3/47* (2013.01); *B01J 29/064* (2013.01); *B01J 29/076* (2013.01); *C10G 3/45* (2013.01); *C10G 3/49* (2013.01); *C10G 3/50* (2013.01); *C10G 45/60* (2013.01); *B01J 23/40* (2013.01); *B01J 23/70* (2013.01); *B01J 29/22* (2013.01); *B01J 29/67* (2013.01); *B01J 29/68* (2013.01); *B01J 29/7415* (2013.01); *C10G 2300/1011* (2013.01); *C10G 2400/30* (2013.01); *Y02P 30/20* (2015.11)

(58) Field of Classification Search
CPC ........ C07C 1/20; C07C 1/207; C07C 1/2072
USPC .................. 585/357, 408, 469, 638, 639
See application file for complete search history.

(56) References Cited

U.S. PATENT DOCUMENTS

| 3,308,069 A * | 3/1967 | Wadlinger et al. ............. 502/62 |
| 3,409,681 A | 11/1968 | Kroll |
| 3,912,787 A | 10/1975 | Nowack et al. |
| 4,665,274 A | 5/1987 | Ichihashi et al. |
| 4,992,605 A | 2/1991 | Craig et al. |
| 5,082,986 A * | 1/1992 | Miller ........................... 585/667 |
| 5,157,179 A | 10/1992 | Setoyama et al. |
| 5,248,841 A * | 9/1993 | Young ........................... 585/467 |
| 5,414,171 A | 5/1995 | Richard et al. |
| 5,424,264 A | 6/1995 | Richard et al. |
| 5,569,803 A | 10/1996 | Takewaki et al. |
| 5,705,722 A | 1/1998 | Monnier et al. |
| 2006/0161032 A1* | 7/2006 | Murzin et al. ................. 585/240 |
| 2006/0175231 A1* | 8/2006 | Hansen et al. ........... 208/120.01 |
| 2006/0207166 A1 | 9/2006 | Herskowitz et al. |
| 2006/0264684 A1 | 11/2006 | Petri et al. |
| 2007/0006523 A1 | 1/2007 | Myllyoja et al. |
| 2007/0010682 A1 | 1/2007 | Myllyoja et al. |
| 2007/0068848 A1 | 3/2007 | Monnier et al. |
| 2007/0135669 A1 | 6/2007 | Koivusalmi et al. |
| 2007/0161832 A1* | 7/2007 | Myllyoja et al. .................. 585/7 |
| 2007/0281875 A1* | 12/2007 | Scheibel et al. ............. 510/101 |
| 2009/0019763 A1* | 1/2009 | Ghonasgi ............... C10G 45/64 44/308 |
| 2009/0031617 A1* | 2/2009 | O'Rear .......................... 44/308 |
| 2009/0075813 A1* | 3/2009 | Whisenhunt et al. .......... 502/64 |

(Continued)

FOREIGN PATENT DOCUMENTS

| EP | 0 501 577 A1 | 9/1992 |
| EP | 0 574 994 A1 | 12/1993 |
| EP | 2 019 132 A1 | 1/2009 |

(Continued)

OTHER PUBLICATIONS

Sotelo-Boyas, R. et al. (2012). "Hydroconversion of Triglycerides into Green Liquid Fuels," in Hydrogenation, Intech, pp. 187-216.*
Dunn, R.O. (2010). The Biodiesel Handbook, $2^{nd}$ ed., edited by G.Knothe & J. Van Gerpen, AOCS Pressm 516 pgs (Office action cites p. 426).*
Murzin, D.Y. et al. (2012). "Triglycerides and Oils for Biofuels," in Kirk-Othmer Encyclopedia of Chemical Technology, 1-14.*
Che Man, Y.B. et al. (1999). JOACS, 76(4), 485-490.*

(Continued)

Primary Examiner — Brian McCaig
(74) Attorney, Agent, or Firm — RatnerPrestia

(57) ABSTRACT

A process for the production of a hydrocarbon product comprises contacting a feedstock with a catalyst composition comprising an active metal selected from platinum, palladium, nickel, cobalt, copper, ruthenium, rhodium and rhenium and an active porous material which is active for the isomerization of unsaturated hydrocarbons, wherein the feedstock comprises a fatty acid a fatty acid ester, a monoglyceride, a diglyceride or a triglyceride.

18 Claims, No Drawings

(56) References Cited

U.S. PATENT DOCUMENTS

2009/0299109 A1 12/2009 Gruber et al.
2011/0277378 A1 11/2011 Von Hebel et al.

FOREIGN PATENT DOCUMENTS

| JP | 7-285892 A | 10/1995 | | |
|----|-----------|---------|---|---|
| JP | 9-2981 A | 1/1997 | | |
| WO | WO 2007/068796 A1 | 6/2007 | | |
| WO | WO 2007/068800 A1 | 6/2007 | | |
| WO | WO 2007/144473 A1 | 12/2007 | | |
| WO | WO-2008/101945 A1 | 8/2008 | | |
| WO | WO-2008/109877 A1 | 9/2008 | | |
| WO | WO 2008/152199 | * | 12/2008 | ............ C10G 3/00 |
| WO | WO 2009/001712 A1 | 12/2008 | | |
| WO | WO-2009/039347 A1 | 3/2009 | | |
| WO | WO-2009/126508 A2 | 10/2009 | | |

OTHER PUBLICATIONS

Thomas, A. (2012). "Fats and Fatty Oils," in Ullmann's Encyclopedia of Industrial Chemistry, 1-71.*

Huber et al., "Processing biomass in conventional oil refineries: Production of high quality diesel by hydrotreating vegetable oils in heavy vacuum oil mixtures," *Applied Catalysis A: General*, vol. 329, 2007, pp. 120-129.
Mathias Snare et al., "Heterogeneous Catalytic Deoxygenation of Stearic Acid for Production of Biodiesel," Ind. Eng. Chem. Res. 2006, 45, 5708-5715.
Tom Kalnes et al. "Green Diesel: A Second Generation Biofuel," Intl. J of Chem. Reactor Eng., vol. 5 (2007), Art. A48.
M.S. Zanuttini et al., "Deoxygenation of m-cresol on $Pt/\gamma-Al_2O_3$ catalysts," Catalysis Today 213 (2013) 9-17, Journal homepage: www.elsevier.com/locate/cattod.
Ezekiel O. Odebunmi et al., "Catalytic Hyrodeoxygenation," Journal of Catalysis 80, 56-64 (1983).
Douglas C. Elliott, "Historical Developments in Hydroprocessing Bio-oils," Energy & Fuels 2007, 21, 1792-1815.
Jelle Wildschut et al., "Hydrotreatment of Fast Pyrolysis Oil Using Heterogeneous Noble-Metal Catalysts," Ind. Eng. Chem. Res. 2009, 48, 10324-10334.
Osman Ilke Senol "Hydrodeoxygenation of aliphatic and Aromatic Oxygenates on Sulphided Catalysts for Production of Second Generation Biofuels" Helsinki University of Technology Nov. 30, 2007.

* cited by examiner

PROCESS FOR THE CONVERSION OF FATTY ACIDS AND DERIVATIVES THEREOF

STATEMENT REGARDING FEDERALLY SPONSORED RESEARCH

This invention was made with Government support under Contract No. W911NF-07-C-0046 and Sub-contract No. UND01-0000005479 awarded by Defense Advanced Research Projects Agency. The Government has certain rights in this invention.

CROSS-REFERENCE TO RELATED APPLICATIONS

This application is the U.S. National Phase application of PCT International Application No. PCT/GB2009/050073, filed Jan. 26, 2009, and claims priority of British Patent Application No. 0801878.0, filed Feb. 1, 2008, and British Patent Application No. 0810779.9, filed, Jun. 12, 2008, the disclosures of all of which are incorporated herein by reference in their entirety for all purposes.

The present invention relates to the conversion of oxygenated organic materials, in particular fatty acids and derivatives such as triglycerides to hydrocarbons. The process is particularly useful for the formation of hydrocarbon mixtures containing high levels of branched alkanes, and some cyclic alkanes and aromatics, in addition to linear alkanes and other compounds from oxygenated organic compounds.

BACKGROUND OF THE INVENTION

The conversion of fatty acids to linear alkanes by deoxygenation using catalysts including nickel and molybdenum is already known. A process for the conversion of linear alkanes to branched alkanes by isomerisation using specified metallosilicates, especially a ferrierite catalyst containing platinum has been described in EP-A-0653399. EP-A-1396531 describes a two-step process for the production of a hydrocarbon from a fatty acid or a fatty acid ester, involving deoxygenation in a first step and isomerisation in a second step. WO 2006/100584 describes a process for the production of diesel fuel from vegetable and animal oils. It is an object of the invention to provide an improved process for the conversion of oxygenated organic materials, especially fatty acids, to hydrocarbon mixtures containing a high level of non-linear components in a single-step process.

SUMMARY OF THE INVENTION

According to the invention we provide a process for the production of a hydrocarbon product comprising contacting a feedstock with a catalyst composition comprising an active metal selected from platinum, palladium, nickel, cobalt, copper, ruthenium, rhodium and rhenium and an active porous material which is active for the isomerisation of unsaturated hydrocarbons, characterised in that the feedstock comprises at least one compound selected from the group consisting of a fatty acid, a fatty acid ester, a monoglyceride, a diglyceride, a triglyceride and mixtures of these compounds.

We have unexpectedly found that the process of the invention provides the possibility of obtaining, selectively, non-linear hydrocarbons from fatty acid or fatty acid ester feedstocks in a one-step process. Using the process of the invention it is possible to remove the carboxyl functionality of the feedstock, by decarboxylation, decarbonylation, hydrodeoxygenation or a combination of reactions and also effect conversion of the alkyl chain to form a branched or cyclic product in the same process step.

DETAILED DESCRIPTION OF THE INVENTION

The feedstock may comprise linear and/or branched fatty acids, fatty acid esters, monoglycerids, diglycerids and/or triglycerides and may comprise a mixture of more than one of the aforementioned classes of compound. When the feedstock is derived from natural sources, it will contain mainly or wholly linear fatty acids, linear fatty acid esters or glycerides, especially triglycerides. Linear fatty acid means carboxylic acids having un-branched hydrocarbon chains and linear fatty acid esters means alkyl esters of these linear carboxylic acids. The hydrocarbon chains may be saturated or unsaturated. Typically the feedstock comprises a mixture of fatty compounds having different carbon chain lengths and varying numbers of double-bonds at different positions in the hydrocarbon chain. A fatty acid suitable as a feedstock for this invention has more than four carbon atoms, typically greater than 8 carbon atoms, preferably from 8 to 26 carbon atoms, although the feedstock may include longer chain fatty acids. Triglycerides are esters of fatty acids with glycerol and are generally naturally occurring in vegetable oils and animal fats, but may include synthetic compounds. The fatty acid feedstocks may be obtained from triglycerides by hydrolysis. Fatty acid esters are generally those obtained by transesterification of triglycerides, which is often carried out using methanol to form methyl esters. However other alkyl esters may be used, whether derived by transesterification, direct esterification or otherwise. Thus fatty acid esters in this context does not include triglycerides, rather we mean esters of fatty acids with monofunctional alcohols, especially alkyl alcohols ROH where R is an alkyl group containing from 1 to 8 carbon atoms. The preferred feedstocks are fatty acids and fatty acid esters, especially fatty acids. The feedstock may be refined and/or purified to remove contaminants prior to contact with the catalyst. Such purification may include the steps of filtering, distillation, treating with absorbents for removal of sulphur- or nitrogen-containing compounds or the removal of metal compounds or other contaminants which may deleteriously affect the performance of the catalyst. The fatty feedstock may be diluted with a suitable diluent, e.g. a hydrocarbon or mixture of hydrocarbons, if required.

The catalyst composition comprises at least one active metal selected from platinum, palladium, nickel, cobalt, copper, ruthenium, rhodium, rhenium, iron and gold and an active porous material which is for example a zeolite, a silico-alumino-phosphate (SAPO) or sulphated zirconia. The active metal is active for hydrogenation and dehydrogenation of hydrocarbon chains and is preferably selected from platinum, ruthenium, nickel or palladium; platinum and palladium being particularly preferred. More than one active metal may be present in the catalyst composition.

Without wishing to be bound by theory, it is generally accepted that the removal of the carboxyl function from the fatty acid or ester may proceed by hydrodeoxygenation, decarboxylation or decarbonylation as illustrated for fatty acids in reaction schemes I-IV.

$$RCO_2H + 3H_2 \rightarrow RCH_3 + 2H_2O \tag{I}$$

$$RCO_2H \rightarrow RH + CO_2 \tag{II}$$

$$RCO_2H \rightarrow R'H + CO + H_2O \quad \text{(III)}$$

$$RCO_2H + H_2 \rightarrow RH + CO + H_2O \quad \text{(IV)}$$

In the above reaction schemes $RCO_2H$ represents a saturated or unsaturated fatty acid, where R is a hydrocarbon radical containing 0, 1 or more than one carbon-carbon multiple bonds. R' represents a group containing one extra carbon-carbon double bond relative to R. Hydrodeoxygenation of a fatty acid may be represented by the reaction scheme I. In this case, the resulting hydrocarbon contains the same number of carbon atoms as the original fatty acid. Decarboxylation of a saturated fatty acid may proceed according to reaction scheme II and produces a hydrocarbon having one fewer carbon atoms than the parent fatty acid. Decarbonylation also produces hydrocarbons with one carbon atom less than the parent fatty acid, and proceeds via scheme III or IV. Therefore the resulting product may be a mixture of hydrocarbons having a different number of carbon atoms. The active metal is believed to be active in the removal of the carboxyl function by hydrodeoxygenation, decarboxylation or decarbonylation and also active in the isomerisation of the hydrocarbon chain. The use of Pt as the active metal, for example, appears to provide both hydrodeoxygenated product and decarboxylated and/or decarbonylated product, i.e. a product containing a mixture of compounds having different hydrocarbon chain lengths. Such product mixtures are desirable for use in certain types of fuel. Therefore in one embodiment of the invention, a catalyst composition for use in the process comprises more than one active metal, the proportions of each active metal being selected to provide a desired mixture of hydrocarbons in the final product. The nature and composition of the starting fatty acid/ester material may therefore influence the choice of active metal(s) provided in the catalyst composition. In addition to reactions I-IV, the active metal is active in the hydrogenation of carbon-carbon double bonds that may be present in the starting material or any intermediates. The level of unsaturation of product mixtures, will therefore be dependent on hydrogen:feed ratios and initial levels of unsaturation in reactants.

Optionally a promoter metal is also present in the catalyst composition. A promoter metal, if present may be associated with and present on the supported active metal/support and/or present on or in the active porous material.

The active metal is dispersed on a support which may be selected from any conventional support such as a silica alumina cogel, silica, a transition alumina such as gamma, delta or theta aluminas, carbon, titania, zirconia and sulphated zirconia or an active porous material. All of the active metal present in the catalyst composition may be supported on particles of the active porous material. Alternatively there may be present in the catalyst composition active metal supported on the active porous material in addition to active metal supported on an alternative support. As a further alternative all of the active metal may be present on a support which is not an active porous material. In a preferred embodiment of the invention, at least a portion of the active metal is supported on particles of the active porous material, e.g. a zeolite or a SAPO material. The amount of active metal present in the catalyst composition depends upon the nature of the active metal(s) present and the reaction mechanism desired to be favoured. When the active metal comprises at least one of Pt or Pd, then the catalyst composition preferably contains from 0.01 to 10%, more preferably 0.1 to 3%, especially 0.5-2.5%, for example about 1-1.5% by weight of the active metal. The active metal is preferably deposited on the surface of a porous support and/or within the pores in said support. The supported active metal may be formed by impregnating the support with a solution of a compound of the metal, followed by drying and, optionally, calcining the dried material. Alternative methods include precipitation of a compound of the active metal onto the support, including precipitation-deposition methods in which a metal complex, e.g. a metal amine complex, is decomposed by heating in the presence of the support. Alternatively, the active metal may be introduced onto the support by ion-exchange if the selected support is susceptible to such methods, e.g. in the case of an acidic active porous material. The active metal is preferably present in the form of elemental metal and so the active metal compound on the support is reduced to the form of elemental metal. The reduction step may be carried out prior to placing the catalyst in the reactor, e.g. by effecting reduction of the solid catalyst particles by contact with a hydrogen-containing gas or by "wet" reduction with a reducing agent such as a hydrazine. Alternatively the active metal compound on the catalyst support may be reduced to active metal in elemental form in the reactor by contacting the catalyst with a reducing gas stream, for example a hydrogen-containing gas stream, for a suitable time to effect reduction. Methods of forming a catalyst by the techniques discussed above and others are known in the art and will be familiar to the skilled person. Catalysts comprising the active metal on a support are known in the art and are available commercially. Such catalysts are described, for example, for use as hydrocarbon isomerisation catalysts in EP-A-0653399.

The active porous material is active in the conversion of hydrocarbons to form branched or cyclic hydrocarbons. The active porous material is preferably selected from a zeolite, sulphated zirconia and silico-alumino-phosphates. Preferred zeolites include ferrierite, mordenite, ZSM 5, beta and faujasite. Zeolites having a range of molar ratios of silica to alumina may be used. We have found that those having molar ratios of silica to alumina of between 15 and 55 have been found to be effective in the reaction but other zeolite compositions may also be useful. Silico-alumino-phosphates useful in the invention include, for example, SAPO-11 and SAPO-31. Preferably the pore diameter of the porous material is approximately in the range from 3-10 Å, more preferably from 4-8 Å. The active porous material preferably includes acid sites. The silica:alumina ratio of a zeolite determines its acidity, with acidity increasing with increased alumina content. The number and strength of acid sites in the active porous material may be optimised within the suggested range for the particular active metal, feedstock and reaction conditions used in order to provide the desired product composition. The provision of additional active porous material or the presence of active metal on a different support may provide a means to gain sufficient active metal and sufficient acidic sites in the active porous material. The active porous material may be selected to provide branched or cyclic hydrocarbons preferentially and a mixture of different porous materials may be used to optimise the selectivity towards the desired hydrocarbon products.

The supported active metal and the active porous support may be present in the reaction space in the form of powders or as formed particles suitable for forming fixed catalyst beds. The form of such particles to provide adequate strength in a catalyst bed and adequate mass and heat transfer characteristics under the desired reaction conditions may be selected by the skilled person. Typically such formed particles have a minimum dimension of at least 1 mm and often a maximum dimension less than 50 mm. Usually such particles are formed from powders by known methods such as tabletting, extrusion or granulation. Frequently additives such as a binder, lubricant or another additive may be present as is conventional in particle forming. The formed particles may have any of a variety of shapes as is known in catalyst manufacture. Typical shapes include tablets, cylinders, fluted cylinders, spheres, rings, wheel-shapes, lobed cylinders, optionally with one or more apertures in the cross-sectional shape.

In a first embodiment of the invention, the catalyst composition comprises the active metal on a support formed from the active porous material. In this embodiment, the catalyst composition may comprise, for example, Pt on ferrierite, Pt on SAPO-11, or Pt on beta zeolite. Optionally an additional quantity of the active porous material may be present, either mixed with the supported active metal or separated from it such that the feed stream contacts the additional active porous material upstream or downstream of the supported active metal. When more than one active metal is used, each metal may be disposed on the same active porous material or a different one. When the same active porous material is used, each metal may be present on the same particles of active porous material or they may be present on different particles, which may then be mixed together or in separate parts of the reaction space. Alternatively quantities of the same active metal may be present on different active porous supports.

In another embodiment of the invention, the catalyst composition comprises a physical mixture of the active metal on a non-active support with separate particles of the active porous material. As an example of this embodiment, the catalyst composition comprises a mixture of a particulate zeolite with a particulate palladium-on-carbon catalyst. When more than one active metal is used, each metal may be dispersed on the same support or a different one. It is also contemplated that more than one active metal may be deposited on the same support particles using co-deposition/co-impregnation or by depositing the second active metal upon a pre-existing active metal+support combination. By physical mixture, we intend that particles of the supported metal and particles of the active porous material are mixed to form a substantially homogeneous mixture or are mixed together. If required, such a mixture may subsequently be formed into a larger particle by a method such as tabletting, extrusion or granulation. In such a case a binder, lubricant or another additive may be present as is conventional in particle forming.

As a further embodiment, the catalyst composition comprises a physical mixture of a first active metal on a non-active support with separate particles comprising a second active metal (which may be the same as or different from the first active metal) supported on an active porous material. As an example of this embodiment, the catalyst composition comprises a mixture of a palladium or platinum supported on a particulate zeolite with a particulate palladium-on-carbon catalyst. Optionally an additional quantity of active porous material may be present in the mixture or disposed as a separate bed upstream or downstream of the mixture.

Using any of the combinations of active metal and active porous material forming the catalyst composition used in the process of the invention, it is possible to provide a subsequent process step to isomerise or hydrogenate or deoxygenate such residual linear hydrocarbon, unsaturation or carboxyl function as may be remaining in the product. This subsequent process step may be required only to serve as a polishing reaction and so may be relatively light duty compared with a process designed to convert the entire feedstock. In an alternative arrangement, the process may comprise the steps of first passing the fatty acid/ester feed and hydrogen-containing gas over a first catalyst comprising a supported active metal such as a NiMo hydrotreating catalyst to effect removal of the carboxyl function and then passing the resulting product, containing some fatty acid/ester and hydrogen over a second catalyst bed comprising an isomerisation catalyst containing active metal and an active porous material, such as Pt-zeolite. In this way residual fatty acid carboxyl groups remaining after contact with the first catalyst bed may be removed during the isomerisation step because the active metal present in the second catalyst is effective to catalyse the removal of the remaining carboxyl functions.

A quantity of another solid particulate material may be present in the catalyst composition or in a bed containing the catalyst composition to aid dispersion, heat transfer or moderate activity in a catalyst bed. Such particles may include metal oxide materials such as alumina, silica etc.

It can be seen from the reaction mechanisms I-IV, that some reaction may be expected to occur in the absence of feeding a hydrogen-containing gas to the reaction mixture. It is, however, preferred that some added hydrogen is present in order to facilitate the hydrogenation of C=C double bonds. Therefore the process preferably includes the step of feeding a hydrogen-containing gas to the reaction mixture in contact with the catalyst composition. The hydrogen-containing gas may comprise pure hydrogen or a mixture of hydrogen with a diluent which is inert under the selected reaction conditions. Suitable inert gases include nitrogen, helium or argon. Suitable hydrogen pressures that may be used are in the range from about 0.1 to about 100 bar at reaction temperature. The amount of hydrogen present in the reaction may influence the mechanism of removal of the carboxyl functionality from the fatty acid or ester. Generally increasing the amount of hydrogen available may be expected to increase the relative amount of hydrodeoxygenation compared with decarboxylation/decarbonylation. Further, altering the amount of hydrogen present will have an effect on the relative proportions of linear alkanes, branched alkanes, cyclic alkanes and aromatics observed in the reaction products.

Although gas-phase reactions are possible using fatty acid feedstocks, it is preferred that the reaction takes place by contact of the fatty feedstock in the liquid phase with the hydrogen-containing gas over a solid catalyst. The catalyst is preferably provided in the form of solid particles having a minimum dimension of at least 1 mm arranged as a fixed bed in a reactor designed to allow contact and flow of the liquid-phase fatty feedstock and a gas phase, if present, over the catalyst particles through the fixed bed, usually in the form of a "trickle bed" arrangement. Alternatively the catalyst may be provided in a structured form, such as a monolith coated with the catalyst composition and arranged such that the liquid and gas-phase reactants contact each other as they flow through channels in the monolith. As a further alternative, the reaction may take place in a slurry phase, the catalyst being provided in the form of small particles or a powder which is dispersed as a slurry within the liquid phase reactant whilst the hydrogen-containing gas is bubbled through the slurry or dispersed within the liquid in a saturator. The reaction may take place in the presence of a solvent, and may take place in conditions designed to maintain the solvent in a supercritical or near-supercritical state.

The reaction temperature is preferably in the range from 200° C. to about 500° C., more preferably 250-400° C., and we have found a temperature range of 270-350° C. to be convenient. At higher temperatures, it is likely that some cracking to much shorter carbon chains, e.g. $C_1$-$C_8$, may occur and this is usually undesirable and uneconomical. It is sometimes desirable to influence the carbon chain length distribution of the product depending on the required product composition and the nature of the feedstock used. By selecting conditions and catalysts which are capable of inducing selective cracking in the hydrocarbon chain, for example to form a product with some $C_8$-$C_{16}$ hydrocarbon chains from a $C_{18}$ feedstock, the resulting hydrocarbon product may have hydrocarbon chains containing fewer carbon atoms than the starting feed. If such cracking is required then it may be preferred to operate the process at a relatively high temperature, e.g. greater than 300° C., depending on the activity and selectivity of the catalyst used. It is normally preferable to carry out the reaction in the liquid phase. Appropriate reaction conditions should be selected and maintained to ensure that the reaction proceeds in a desirable way.

EXAMPLES

The process of the invention will be further described in the following examples.

Example 1

25 g of palmitic acid, 285 g of dodecane and 15 g of a catalyst containing 0.3 wt. % of Pt on ferrierite (silica/alumina=20) were placed into an autoclave. The vessel was purged twice with hydrogen, and the pressure was then set to 10 bar at room temperature. The autoclave was sealed and heated to 298° C. at a rate of 10° C./min and stirred at 600 rpm for a total period of 12 hours. When cool, the reaction mixture was analysed by gas chromatography (GC), and the acid value determined by titration with potassium hydroxide. The acid value of the mixtures was determined using the procedure shown below. The composition of the liquid product was derived from GC measurements, and is shown in Table 1. Conversion of fatty acid was found to be 45% with product hydrocarbons having both 15 and 16 carbon atoms. 48.5% of the hydrocarbon product was branched.

Acid Value 100 cm³ of neutralized 1:1 isopropanol:toluene mixture was added to a known mass (up to approximately 5 g) of the fatty acid sample in an Erlenmyer flask. The mixture was gently heated until the fatty acid was fully dissolved. 1 cm³ of phenolphthalein was added to the solution and it was then titrated against KOH (0.1 M), using the continued presence of a pale pink colour as an end point.

The acid value was then calculated using:

$$AV = \frac{V_{KOH} \times M_{KOH} \times 56.1}{m}$$

where:

AV=acid value (in units of milligrams KOH per gram of sample),
$M_{KOH}$=molarity of KOH solution,
$V_{KOH}$=volume of KOH used in titration (cm³),
m=mass of sample (g).

Example 2

The process of Example 1 was repeated but using a hydrogen pressure of 30 bar. The results are shown in Table 1.

Example 3

The process of Example 1 was repeated but using a hydrogen pressure of 4 bar. The results are shown in Table 1.

Example 4

The process of Example 1 was repeated using 5 g of a catalyst containing 5 wt. % Pt on mordenite and a hydrogen pressure of 10 bar. The results are shown in Table 1.

TABLE 1

|  | Example 1 | Example 2 | Example 3 | Example 4 | Example 5 (comparison) |
|---|---|---|---|---|---|
| H₂ pressure (bar) | 10 | 30 | 4 | 10 | 10 |
| Catalyst | 0.3 wt. % Pt/ferrierite | 0.3 wt. % Pt/ferrierite | 0.3 wt. % Pt/ferrierite | 5 wt. % Pt/mordenite | 5 wt. % Pd/C |
| Acid value initial (mg KOH/g) | 214 | 214 | 214 | 214 | 214 |
| Acid value final (mg KOH/g) | 118 | 90 | 116 | 11 | 99 |
| Conversion (%) | 45 | 58 | 46 | 95 | 54 |
| Product C15 linear (%) | 17.8 | 11.4 | 11.2 | 41.0 | 100 |
| Product C15 branched (%) | 6.8 | 4.9 | 4.1 | 2.0 | 0.0 |
| Product C16 linear (%) | 23.7 | 44.7 | 7.5 | 55.0 | 0.0 |
| Product C16 branched (%) | 41.7 | 38.2 | 3.9 | 2.0 | 0.0 |
| Other product (%) | 10.0 | 0.8 | 73.1 | 0.0 | 0.0 |

Example 5

Comparison

The process of Example 1 was repeated using 2.5 g of a catalyst containing 5 wt. % Pd on carbon and a hydrogen pressure of 10 bar. The reaction was run for 4 hours. The results, in Table 1, show that this catalyst produces hydrocarbons from the feed, but they are linear, presumably due to the lack of sufficient acidic sites on the support.

Example 6

25 g of oleic acid, 285 g of tetradecane and 15 g of a catalyst containing 0.3 wt. % of Pt on ferrierite (silica/alumina=20) were placed into an autoclave. The vessel was purged twice with hydrogen, and the pressure was then set to 20 bar at room temperature. The autoclave was sealed and heated to 275° C. with stirring at 600 rpm, and held at that temperature for 2 hours 50 minutes. The temperature was then raised to 350° C. and held at that temperature for a further 50 minutes. When cool, the reaction mixture was analysed by gas chromatography and the acid value determined by titration with potassium hydroxide. Conversion of fatty acid was found to be 100% with products having a range of number of carbon atoms. Table 2 shows the product distribution of the $C_8$-$C_{18}$ mixture of products. A mixture of linear, branched and cyclic hydrocarbons were present in the product mixture, with the combined total of cyclic and branched hydrocarbons forming 30% of the total product mixture. By mass, 61% of the maximum theoretical conversion to this product distribution was obtained.

TABLE 2

| Carbon number | Proportion (%) |
|---|---|
| 18 | 15 |
| 17 | 25 |
| 16 | 1 |
| 15 | 14 |
| 14 | 0 |
| 13 | 1 |
| 12 | 20 |
| 11 | 5 |
| 10 | 4 |
| 9 | 6 |
| 8 | 7 |

Example 7-12

25 g of oleic acid, 285 g of dodecane and the catalyst (shown in Table 3) were charged into an autoclave. The vessel was purged twice with hydrogen, and the pressure was then set to the value shown in Table 3 at room temperature. The autoclave was sealed and heated to a reaction temperature of 350° C. which was maintained for a period of 2 hours, with stirring at 600 rpm. Following the reaction, the autoclave was allowed to cool and vented. The acid value of the product mixture was determined and further analysis by gas chromatography and proton NMR was done to determine conversions and product distributions. The chain length distribution for products in the $C_8$-$C_{18}$ range is shown in Table 3. These values were determined by GC measurements. Conversions and the proportion of aromatics, branched alkanes and linear alkanes in the product mixture is also shown in Table 3. These values were determined by GC, acid value and proton NMR measurements.

Example 13

The procedure of Example 7 was followed but using a catalyst comprising 0.3 wt. % Pt on beta zeolite (silica/alumina=38) and a temperature of 270° C. The results are shown in Table 3. The "branched alkanes" value of 23% for this example represents the total proportion of non-linear hydrocarbons, i.e. aromatics+branched alkanes.

Example 14 & 15

The procedure of Example 7 was followed, using as reactant 25 g of rapeseed triglyceride or 25 g of rapeseed fatty acid. The proportion of triglyceride, free fatty acid and hydrocarbon resulting from reaction of the rapeseed fatty acid feed is shown in Table 4. These results indicate that the Pt/ferrierite catalyst is more effective at converting the fatty acid to hydrocarbons than the triglyceride feed. The conversion of the triglyceride feed to free fatty acid also potentially consumes hydrogen.

TABLE 3

| | Example Number | | | | | | |
|---|---|---|---|---|---|---|---|
| | 7 | 8 | 9 | 10 | 11 | 12 | 13 |
| Reactant | OLA | OLA | OLA | OLA | OLA | OLA | OLA |
| Solvent | DOD | DOD | DOD | DOD | DOD | DOD | DOD |
| Catalyst active metal | Pt | Pt | Pd | Pt | Pt | Pt | Pt |
| Metal in catalyst (wt. %) | 0.3 | 2.0 | 0.3 | 0.3 | 0.3 | 0.3 | 0.3 |
| Amount catalyst (g) | 3 | 3 | 3 | 3 | 3 | 3 | 3 |
| Porous material | F20 | F20 | F20 | F55 | F20 | F20 | B38 |
| $H_2$ pressure (bar) | 20 | 20 | 20 | 20 | 10 | 40 | 20 |
| Conversion (%) | 52 | 54 | 49 | 27 | 39 | 51 | 37 |
| Branched alkanes (%) | 37 | 16 | 53 | 29 | 0 | 29 | 23* |
| Linear alkanes (%) | 63 | 83 | 44 | 71 | 66 | 66 | 77 |
| Aromatics (%) | 0 | 1 | 3 | 0 | 34 | 5 | * |
| C18 (%) | 13 | 30 | 16 | 34 | 4 | 32 | 54 |
| C17 (%) | 71 | 60 | 58 | 56 | 79 | 54 | 28 |
| C16 (%) | 2 | 1 | 2 | 1 | 2 | 1 | 2 |
| C15 (%) | 3 | 3 | 2 | 2 | 3 | 2 | 2 |
| C14 (%) | 0 | 0 | 2 | 2 | 1 | 0 | 3 |
| C13 (%) | 3 | 1 | 2 | 0 | 2 | 2 | 0 |
| C12 (%) | 0 | 0 | 0 | 0 | 0 | 0 | 0 |
| C11 (%) | 4 | 2 | 5 | 2 | 3 | 4 | 1 |
| C10 (%) | 1 | 1 | 4 | 1 | 1 | 2 | 1 |
| C9 (%) | 3 | 2 | 8 | 3 | 5 | 3 | 8 |
| C8 (%) | 0 | 0 | 0 | 0 | 0 | 0 | 0 |

OLA = Oleic Acid
DOD = Dodecane
F20 = Ferrierite having silica/alumina = 20
F55 = Ferrierite having silica/alumina = 55
B38 = Beta zeolite having silica/alumina = 38
*total non linear product (aromatics + branched alkanes)

TABLE 4

| | | Product mixture composition (%) | | |
|---|---|---|---|---|
| Example | Feed | Triglyceride | Free fatty acid | hydrocarbons |
| 14 | Triglyceride | 43 | 43 | 14 |
| 15 | Fatty acid | 0 | 43 | 57 |

Example 16

285 g of dodecane (solvent) and 9.16 g of catalyst (0.3 wt. % Ni on ferrierite (silica/alumina=20)) were charged into an autoclave reaction vessel. The vessel was purged twice with hydrogen, and the pressure was then set to 40 bar at room temperature. The autoclave was sealed and heated to a temperature of 350° C. which was maintained for a period of 24 hours, with stirring at 600 rpm. The autoclave was then allowed to cool, vented and charged with 25 g of oleic acid as a reactant. The vessel was then resealed and purged twice with hydrogen followed by setting the hydrogen pressure to 20 bar at room temperature. The autoclave was then heated to a reaction temperature of 350° C. which was maintained for a period of 2 hours, with stirring at 600 rpm. Following the reaction, the autoclave was allowed to cool and vented. The acid value of the liquid product mixture was determined and it was further analysed by gas chromatography to determine conversions and product distributions. The proportion of non-linear hydrocarbons (aromatics and branched alkanes) and linear alkanes is shown in Table 5, together with the chain length distribution for products in the $C_8$-$C_{18}$ range.

TABLE 5

| Chain length | Proportion (%) |
|---|---|
| 18 | 0 |
| 17 | 9 |
| 16 | 2 |
| 15 | 7 |
| 14 | 5 |
| 13 | 7 |
| 12 | 0 |
| 11 | 11 |
| 10 | 24 |
| 9 | 35 |
| 8 | 0 |
| Conversion by acid value (%) | 51 |
| Total proportion non-linear (aromatics + branched alkanes) (%) | 88 |
| Proportion of linear alkanes in products (%) | 12 |

The invention claimed is:

1. A process for the production of a branched or cyclic hydrocarbon product comprising contacting a feedstock with a catalyst composition comprising an active metal selected from the group consisting of platinum, palladium, nickel, cobalt, copper, ruthenium, rhodium, and rhenium and an active porous material which is active for the isomerisation of unsaturated hydrocarbons,
wherein the feedstock comprises at least one compound selected from the group consisting of a linear fatty acid, an ester of a linear fatty acid with a monofunctional alcohol, and mixtures of these compounds, and
wherein the contacting causes the at least one compound to be hydrodeoxygenated and converted into the branched or cyclic hydrocarbon, the branched or cyclic hydrocarbon product having the same number of carbons as the at least one compound.

2. A process according to claim 1, wherein said active metal is in dispersed form supported on particles of a support material.

3. A process according to claim 2, wherein said support material comprises particles of said active porous material.

4. A process according to claim 2, wherein said support material comprises particles of a material selected from the group consisting of silica-alumina, silica, a transition alumina, carbon, titanic or zirconia.

5. A process according to claim 1, wherein said catalyst composition comprises particles of said active porous material having no active metal supported thereon.

6. A process according to claim 1, wherein said active metal comprises platinum and/or palladium.

7. A process according to claim 1, wherein said active porous material comprises at least one of a material selected from the group consisting of a zeolite, a silico-aluminophosphate (SAPO) or sulphated zirconia.

8. A process according to claim 7, wherein said active porous material comprises a zeolite having a molar ratio of silica to alumina of from 15 to 55.

9. A process according to claim 1, wherein said linear fatty acid contains from 4 to 26 carbon atoms.

10. A process according to claim 1, wherein the feedstock is contacted with the catalyst composition in the presence of a hydrogen-containing gas.

11. A process according to claim 1, wherein said hydrocarbon product comprises at least one branched hydrocarbon.

12. A process according to claim 1, wherein said hydrocarbon product comprises at least one cyclic hydrocarbon.

13. A process according to claim 1, wherein said hydrocarbon product comprises at least one aromatic hydrocarbon.

14. A process according to claim 1, wherein the feedstock is contacted with the catalyst composition in the presence of a solvent.

15. A process according to claim 1, wherein the feedstock further comprises a diluent selected from at least one hydrocarbon.

16. A process according to claim 1, wherein the feedstock consists essentially of the at least one compound and optionally a diluent.

17. A process according to claim 1, wherein the feedstock consists essentially of the at least one compound and optionally a diluent selected from at least one hydrocarbon.

18. A process according to claim 1, wherein the contacting causing the at least one compound to be hydrodeoxygenated and converted is performed in a single step.

* * * * *